US007339857B2

(12) United States Patent
Matthey

(10) Patent No.: US 7,339,857 B2
(45) Date of Patent: Mar. 4, 2008

(54) VIBRATING DEVICE PROVIDED WITH MECHANICAL SHOCK PROTECTION MEANS FOR A PORTABLE OBJECT

(75) Inventor: Gérald Maurice Matthey, Ballaigues (CH)

(73) Assignee: Eta Sa Manufacture Horlogere Suisse, Grenchen (CH)

( * ) Notice: Subject to any disclaimer, the term of this patent is extended or adjusted under 35 U.S.C. 154(b) by 115 days.

(21) Appl. No.: 11/303,995

(22) Filed: Dec. 19, 2005

(65) Prior Publication Data

US 2006/0133218 A1 Jun. 22, 2006

(30) Foreign Application Priority Data

Dec. 22, 2004 (EP) ................................ 04106904

(51) Int. Cl.
*H02K 33/00* (2006.01)

(52) U.S. Cl. ........................ 368/250; 310/15; 368/230

(58) Field of Classification Search ................ 368/230, 368/250, 255; 340/407.1; 310/81, 14, 12–13, 310/15, 10, 17

See application file for complete search history.

(56) References Cited

U.S. PATENT DOCUMENTS 5,528,697 A * 6/1996 Saito .......................... 381/396
6,211,775 B1 * 4/2001 Lee et al. ................ 340/407.1
6,492,899 B1 12/2002 Yamaguchi
6,720,691 B2 * 4/2004 Yoneyama et al. ........... 310/81
2001/0030474 A1 * 10/2001 Sakai et al. .................. 310/81

(Continued)

FOREIGN PATENT DOCUMENTS

DE 41 17 227 A1 12/1992

(Continued)

OTHER PUBLICATIONS

Journal of Magnetism and Magnetic Materials, Elsevier, Amsterdam, NL, vol. 242-245, Apr. 2002, pp. 1195-1197, XP004360865.

*Primary Examiner*—Vit Miska
*Assistant Examiner*—Sean Kayes
(74) *Attorney, Agent, or Firm*—Sughrue Mion, PLLC

(57) ABSTRACT

The vibrating device (1) is mounted in a portable object, such as a wristwatch, to act in particular as a silent alarm. The device includes a moving mass (3*a*, 3*b*, 6, 15) formed in part by a magnetic structure connected to a fixed structure (5) via a spring element (4), and a coil (2) connected to the fixed structure without any mechanical contact with the moving mass. The coil is electro-magnetically coupled to the moving mass to enable it to oscillate in at least one direction of oscillation (X) when it is being powered by alternating electrical signals at a determined frequency. A fixed part of the vibrating device includes a part (4*d*) forming part of the spring element, which is mounted on the fixed structure. This part includes a longitudinal aperture (14) in the direction of oscillation combined with a surface of the fixed structure to define guide means in which a projecting element (16) of the moving mass is placed. This longitudinal aperture is dimensioned so as to allow the moving mass to oscillate freely in a normal operating mode of the vibrating device (1) at least up to a determined maximum amplitude value. However, the aperture limits the movement amplitude of the moving mass in a determined manner in all directions, to protect the vibrating device from mechanical shocks.

8 Claims, 4 Drawing Sheets

U.S. PATENT DOCUMENTS

| | | | | |
|---|---|---|---|---|
| 2003/0227225 | A1* | 12/2003 | Kaneda et al. | 310/81 |
| 2004/0075351 | A1* | 4/2004 | Ueda et al. | 310/81 |
| 2004/0150277 | A1* | 8/2004 | Moriyasu | 310/81 |
| 2005/0254672 | A1* | 11/2005 | Kobayashi | 381/151 |

FOREIGN PATENT DOCUMENTS

| | | | |
|---|---|---|---|
| EP | 625 738 | A1 | 11/1994 |

* cited by examiner

VIBRATING DEVICE PROVIDED WITH MECHANICAL SHOCK PROTECTION MEANS FOR A PORTABLE OBJECT

BACKGROUND OF THE INVENTION

This application claims priority from European Patent Application No. 04106904.8 filed Dec. 22, 2004, the entire disclosure of which is incorporated herein by reference.

The present invention concerns a vibrating device, which includes means protecting against mechanical shocks, for a portable object, such as a wristwatch. The vibrating device includes a moving mass formed in part by a magnetic structure connected to a fixed structure by means of a spring element and a coil connected to the fixed structure with no mechanical contact with the moving mass. The coil is electromagnetically coupled to the moving mass to enable it to oscillate in at least one oscillation direction when it is being powered by alternating electrical signals at a determined frequency.

The vibrating device for a portable object can be used for generating a silent alarm or for indicating a telephone call by vibration. In order to do this, the coil has to be electrically activated to activate the moving mass in order to create a low frequency vibration that can be felt by the person carrying the object. The vibration can be controlled as a function of specific programming of the portable object so as to warn the user of a specific event, for example an alarm time, a telephone call etc.

The vibrating device can be fitted to a portable object, such as a wristwatch, a mobile telephone, a conventional organiser, a pager device or another object of small size. Since the vibrating device includes a relatively large moving mass with respect to the total mass of the device, it must be protected from any mechanical shock. Consequently, the moving mass of the vibrating device has to be prevented from undergoing movements due to shocks, in relation to the fixed structure, of too large amplitude in any direction. With such mechanical shocks, the spring element, holding the moving mass in relation to the coil connected to the fixed structure, can be subject to buckling or significant fatigue capable of quickly damaging or breaking the vibrating device.

An example of a vibrating device of small size is disclosed in EP Patent No. 0 625 738. In this document, the vibrating device is formed of a cylindrical coil mounted on a body of a ferromagnetic structure, a moving mass which includes a permanent magnet polarised in a direction parallel to the axis of the coil, and resilient elements connecting the moving mass to the ferromagnetic structure. The ferromagnetic structure includes electromagnetic excitation portions directed perpendicularly in relation to the coil axis, the excitation portions being opposite polar parts of the moving mass. When the coil is being powered by alternating electrical signals, the mass with the permanent magnet describes a quasi-linear oscillating movement.

One drawback of such a device disclosed in EP Patent No. 0 625 738 is that it is sensitive to shocks, since the moving mass has to be large in order for the vibrating device fitted for example to a wristwatch to provide a vibration capable of being felt by the person wearing the watch. Consequently, the resilient elements are likely to undergo significant deformations or to break during large mechanical shocks.

SUMMARY OF THE INVENTION

It is thus a main object of the invention to overcome the aforecited drawbacks by providing a vibrating device capable of including means protecting against mechanical shocks.

The invention therefore concerns a vibrating device that is characterized in that a fixed part of the vibrating device is arranged so as to cooperate with a part of the moving mass to allow the moving mass to oscillate freely in a normal operating mode of the vibrating device at least to a determined maximum amplitude value, and to limit the movement amplitude of the moving mass in a determined manner in all directions in order to protect the vibrating device from mechanical shocks.

One advantage of the vibrating device according to the invention lies in the fact that it includes protective means for limiting the movement amplitude of the moving mass particularly in directions other than the own oscillation direction of the moving mass during normal operation of the vibrating device. Moreover, the protective means also limit the movement amplitude of the moving mass in the direction of oscillation to an amplitude value that is preferably slightly higher than the maximum oscillation amplitude value of the moving mass in normal operation. Since the movement amplitude of said moving mass is limited, this protects the spring element of the vibrating device from any mechanical stress (twisting, bending) due to a mechanical shock.

The spring element is preferably made up of a base strip fixed to the fixed structure and two strip springs integral with the base strip. The two strip springs are arranged substantially perpendicular to the base strip on two opposite sides of said base strip. The moving mass is held between the two strip springs and is fixed to an end strip which connects the ends of the opposite strip springs to the base strip.

The spring element further includes a part integral with the base strip, which is arranged on one side of the base strip parallel to the direction of oscillation of the moving mass. This flat part is arranged perpendicular to the base strip and includes a longitudinal aperture in the direction of oscillation combined with a surface of the fixed structure to which the base strip is fixed. An element projecting from the moving mass is arranged partly through the longitudinal aperture so that the longitudinal aperture of the flat part defines means for protecting or guiding the projecting element of the moving mass.

The edges of the aperture fulfil the role of stop elements for the projecting element in order to limit the movement of the moving mass to a determined movement amplitude, which constitutes one advantage of the vibrating device. The width of the aperture is chosen to be of a dimension greater than the thickness of the part of the projecting element passing through the aperture, but preferably of smaller dimension to twice the thickness of the part of said projecting element in order to protect the vibrating device. The length of the aperture is however chosen so as to allow the moving mass to oscillate freely to a determined maximum amplitude during normal operation of the vibrating device.

One advantage due to the fact that the guide means are defined by the flat part which forms an integral part of the spring element is that it is not therefore necessary to mount additional elements on the device in order to protect the latter. Several spring elements with their strips and part can easily be made by drawing and bending sheet metal. The vibrating device is thus formed of components that are easy to make and mount while protecting the moving mass against mechanical shocks.

Preferably, the moving mass includes a second projecting element arranged on one side of the mass opposite the first projecting element. This second projecting element is to be positioned in a guide housing of suitable dimensions in one wall of an inner platform of a portable object when the vibrating device is fixed on the platform. Via this arrangement of the projecting elements cooperating with guide means for the vibrating device and for the portable object, better protection against mechanical shocks is ensured in all directions.

The invention also concerns a portable object, such as a wristwatch, including an aforecited vibrating device, the vibrating device being fixed to a platform of the portable object, which is characterized in that the platform includes a wall with a guide housing in which a projecting element of the moving mass of the vibrating device is housed, which is arranged on one side of the moving mass opposite the fixed structure, the guide housing being of suitable dimensions so as to allow the moving mass to oscillate freely in a normal operating mode of the vibrating device at least up to a determined maximum amplitude value, and to limit the movement amplitude of the moving mass in a determined manner in all directions in order to protect the vibrating device from mechanical shocks.

BRIEF DESCRIPTION OF THE DRAWINGS

The objects, advantages and features of the vibrating device for a portable object will appear more clearly in the following description of at least one embodiment of the invention in conjunction with the drawings, in which.

DETAILED DESCRIPTION OF A PREFERRED EMBODIMENT

In the following description of a preferred embodiment of a vibrating device, all of the elements that form the latter that are well known to those skilled in this technical field will be explained in a simplified manner. Preferably, the vibrating device and a drive circuit for the device are to be fitted to a portable object of small size, such as a wristwatch so as to provide a silent alarm by the vibration of a moving mass of the vibrating device.

Figure 1:
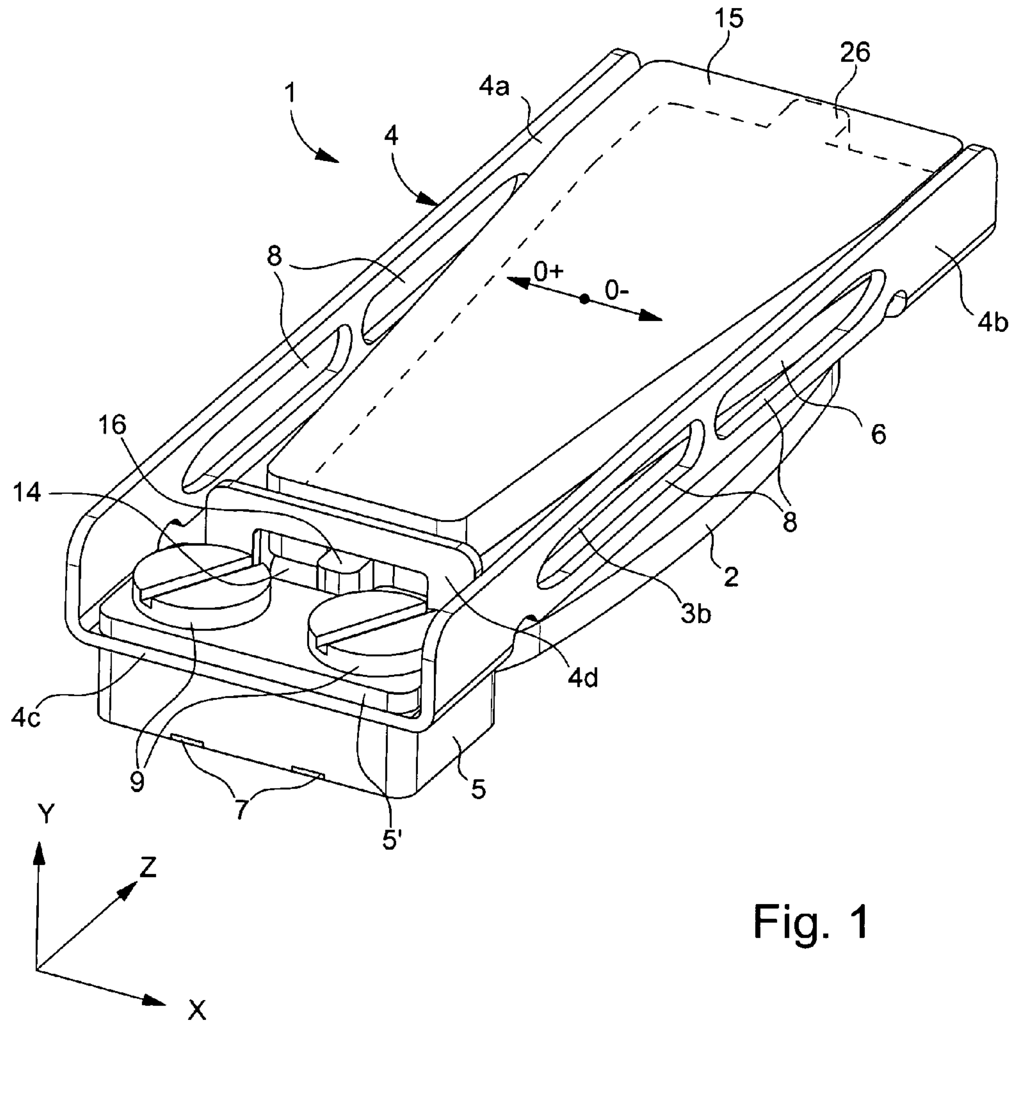
FIG. 1 shows a three-dimensional view of a vibrating device fitted with means protecting against mechanical shocks according to the invention.
Figure 2:
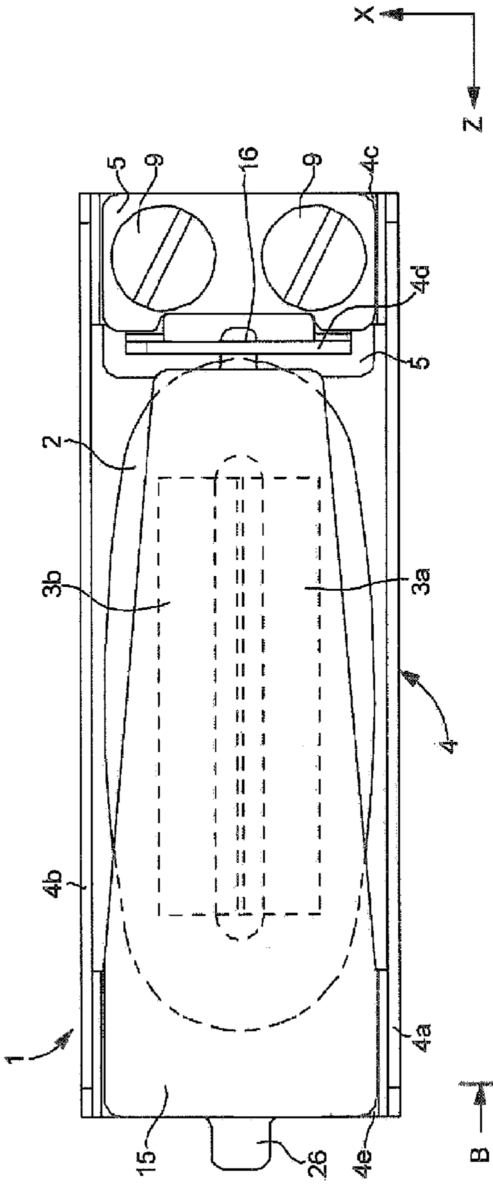
FIG. 2 shows a top view of the vibrating device according to the invention showing the arrangement of the mechanical shock protection means.

FIGS. 1 and 2 show a preferred embodiment of vibrating device 1 that is to be mounted in a case of a portable object, such as a wristwatch. This vibrating device 1 is defined as a half Voice Coil vibrating device. It is preferably used for generating a silent alarm or for indicating telephone calls by vibrating.

Vibrating device 1 includes an annular flat coil 2, which is fixed at the edge to a fixed non-magnetic structure 5. Coil 2 can include one or several substantially coaxial adjoining turns. Two electrical connection terminals 7 of coil 2 are shown in FIG. 1 on a lower part of non-magnetic structure 5. Once the vibrating device is fixed to a printed circuit board of the portable object, the connection terminals can be welded to corresponding metallic pads so they can be connected to an electronic drive circuit of vibrating device 1 that is not shown.

Vibrating device 1 further includes a moving mass 3*a*, 3*b*, 6 and 15 made up in part of a magnetic structure. This moving mass is connected to non-magnetic structure 5 without any mechanical contact with the coil using a spring element 4, which includes a flat part 4*d* explained hereinafter for acting as guide means for the moving mass in order to protect the device from any mechanical shock.

The magnetic structure of the moving mass includes a ferromagnetic plate 6 to which two adjacent permanent magnets 3*a* and 3*b* are fixed with opposite directions of magnetisation respectively facing two diametrically opposite portions of the coil. The magnets generate a magnetic field B, which is led into the ferromagnetic plate 6, in a direction along the Y axis perpendicular to the plane of the coil.

When coil 2 is being powered by alternating electrical signals, which are for example successive rectangular voltage pulses, the current passing in the coil portions is substantially perpendicular to the magnetic field B in the direction of the Z axis. Consequently, a Laplace force in a direction along the X axis is obtained in order to make the moving mass oscillate in a substantially perpendicular plane to the axis of coil 2 in a determined oscillation direction. The movement of the moving mass is substantially sinusoidal in the opposite directions represented by O+ and O− in relation to a central rest position of the moving mass. The resonant frequency of the moving mass can be of the order of 135 Hz for example.

In order to obtain a larger mass, a complementary mass plate 15 can be placed on ferromagnetic plate 6. This complementary plate 15 can be made in a material such as tungsten or brass.

Spring element 4, which holds the moving mass, includes a base plate 4*c* secured by two screws 9 via a non-magnetic plate 5' on the fixed non-magnetic structure 5, and two strip springs 4*a* and 4*b* integral with the base strip and arranged on two opposite sides of the base strip. The strip springs 4*a* and 4*b* are arranged perpendicularly in relation to the base strip 4*c*, such that the transverse section forms a U. An end strip 4*e* connects the ends of strip springs 4*a* and 4*b* opposite the base strip. This end strip, to which a portion of ferromagnetic plate 6 is for example fixed by welding or bonding, is in a substantially parallel plane to the base strip.

Ferromagnetic plate 6 and complementary plate 15 are placed between strip springs 4*a* and 4*b* without any direct contact with each strip spring. Preferably, the height of ferromagnetic plate 6 and complementary plate 15 is lower than the height of strip springs 4*a* and 4*b*. Each strip spring can include two longitudinal transverse slots 8, which are dimensioned to adjust a theoretical resonant frequency of the vibrating device.

In order to fit a wristwatch for example, the dimensions of the vibrating device in FIGS. 1 and 2 can be 10 mm long, 4 mm wide and 2 mm high with a coil that can include up to 400 adjoining substantially coaxial turns.

It will be understood that because of the small size desired for vibrating device 1, spring element 4 holding the relatively large moving mass has to be protected from any mechanical stress caused by a mechanical shock. In order to do this, spring element 4 includes a flat part 4*d* which is integral with base strip 4*c* and is arranged substantially perpendicularly to the base strip opposite the moving mass and parallel to the direction of oscillation of the moving mass.

Flat part 4*d* includes a longitudinal aperture of substantially rectangular shape 14 in the direction of oscillation combined with a surface of fixed structure 5 on which base strip 4*c* is fixed. Ferromagnetic plate 6 of the moving mass includes a projecting element 16, which penetrates through the longitudinal aperture such that a part of the projecting element is arranged in aperture 14 with some play. This longitudinal aperture defines guide means for the moving mass. The edges of the aperture however define mechanical stop members for limiting the movement amplitude of the moving mass in a determined manner at least in the directions along the X and Y axes.

The width of aperture 14 is of slightly larger dimensions than the thickness of the part of the projecting element in the aperture, but less than twice the thickness of this part of said projecting element. Of course, the thickness of the projecting element can be non-uniform in the Z axis direction. It could take the shape of a hook with the thickness of the parts of the projecting element outside the aperture being larger than the width of the aperture in order to ensure better protection against shocks also in the Z axis direction.

Instead of making an aperture in part 4*d*, one could also have envisaged shaping the part into an L so as to define a housing with the surface of fixed structure 5 to which base strip 4*c* is secured. However, this embodiment requires making two bends in part 4*d* and forming stop members at the ends of the part in the longitudinal direction to limit the movement amplitude of the moving mass in the direction of oscillation along the X axis.

Since the fixed part of the vibrating device includes mechanical shock protection means via part 4*d* which forms part of spring element 4, no additional element is therefore necessary in order to protect the vibrating device. Consequently, the vibrating device is easy to make while being protected from any mechanical shock.

In order to ensure better protection against mechanical shocks in all directions, vibrating device 1 also includes a second projecting element 26 for cooperating with one wall housing of a platform explained hereinafter with reference to FIGS. 3, 4*a* and 4*b*. This second projecting element 26 is placed on one side of the moving mass opposite first projecting element 16. This second projecting element is integral with the ferromagnetic plate just like the first projecting element. Preferably, the two projecting elements are arranged on a central line of the moving mass perpendicular to the direction of oscillation of said mass.

It should be noted that projecting elements 16 and 26 could be integral with ferromagnetic plate 6 as described hereinbefore. However, they can be provided on complementary plate 15 rather than on ferromagnetic plate 6. These projecting elements can also be secured to either plate or at the intersection of the two plates by any means. They can be screwed, welded or bonded onto the plate or plates.

Figure 4A:
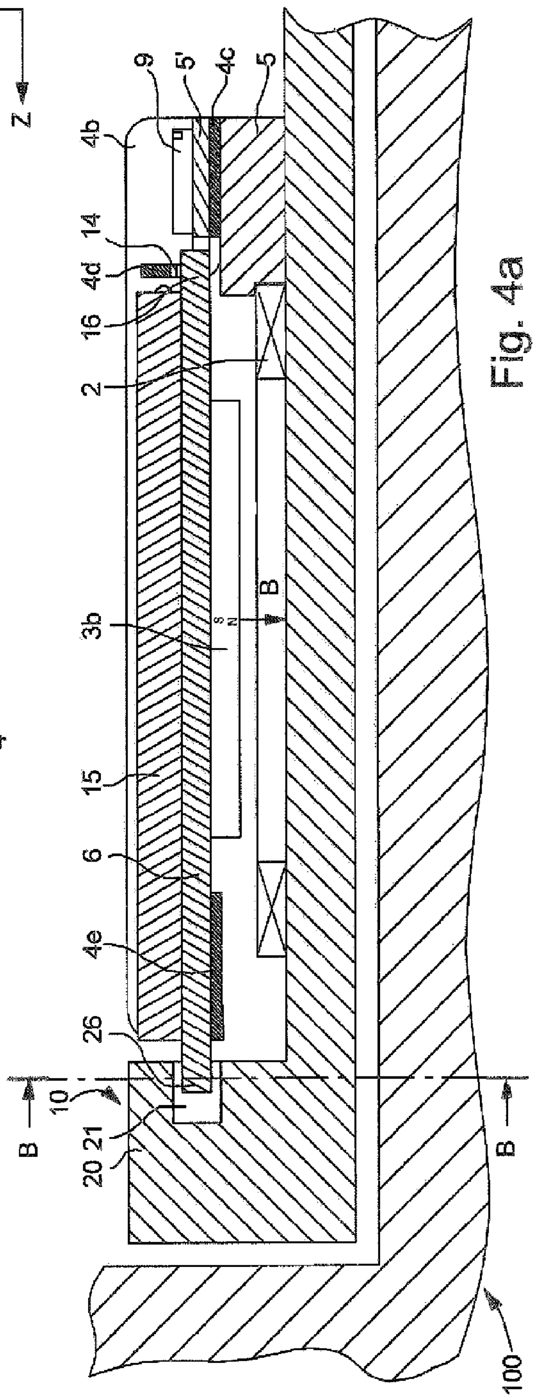
FIG. 4*a* shows a cross-section along the line A-A of FIG. 3 of the portable object including the vibrating device according to the invention.
Figure 3:
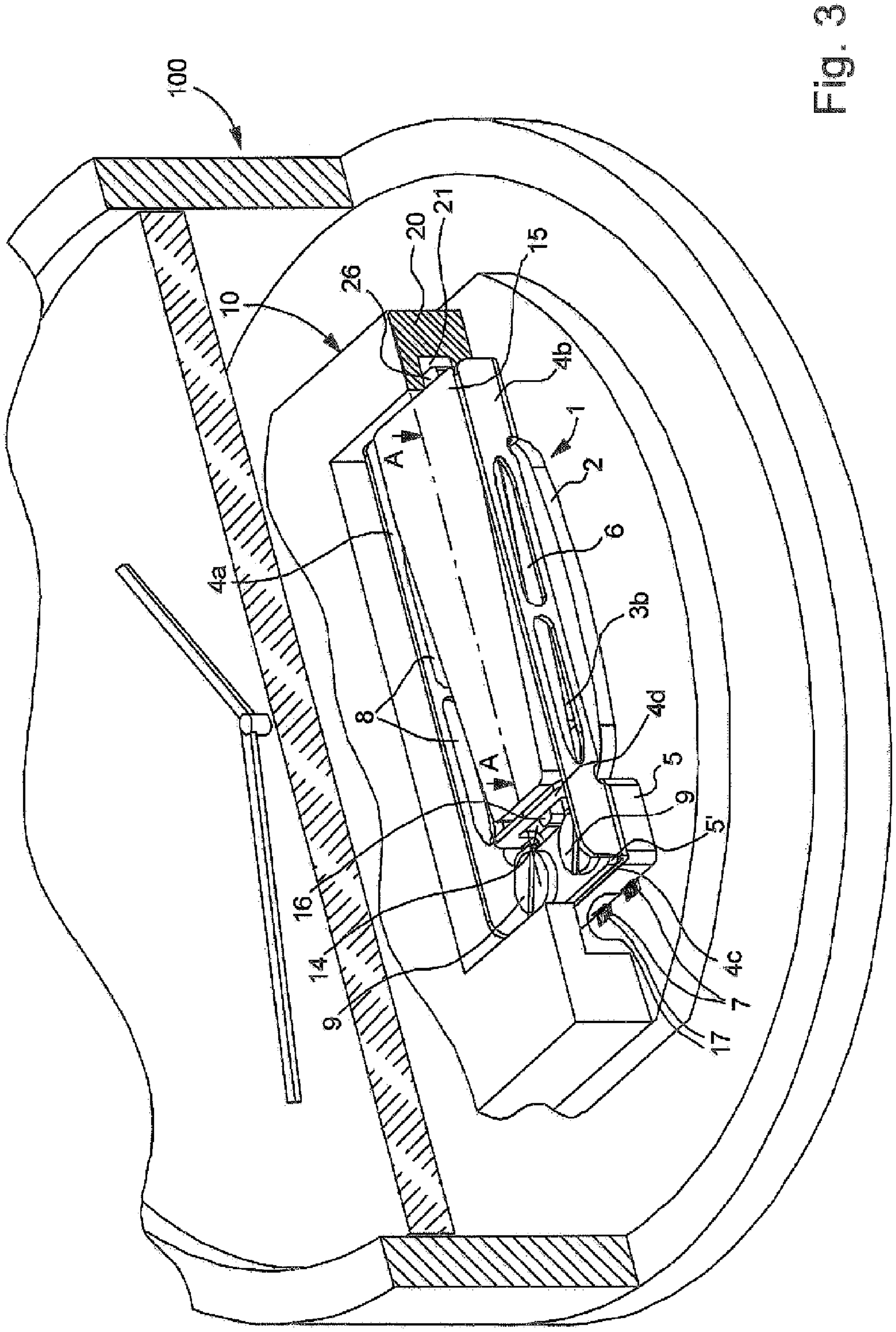
FIG. 3 shows a partial three-dimensional view of a part of a portable object which includes the vibrating device fitted with the mechanical shock protection means according to the invention.
Figure 4B:
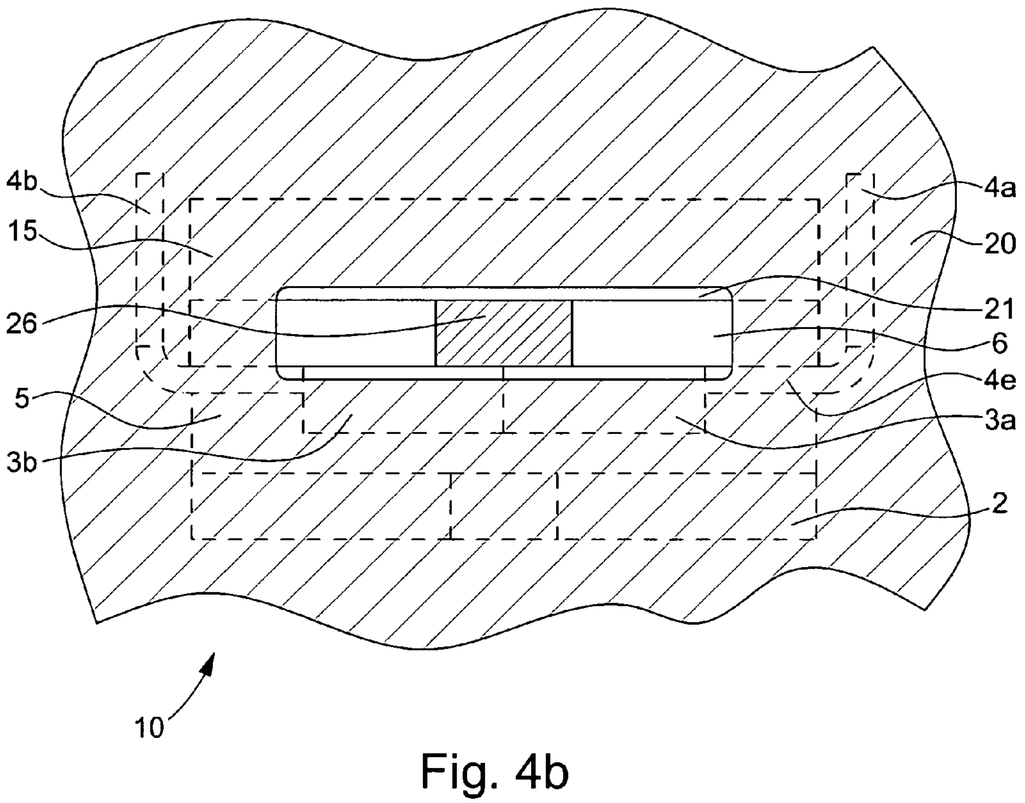
FIG. 4*b* shows a cross-section along the line B-B of FIG. 4*a* of the portable object including the vibrating device according to the invention.

FIGS. 3, 4*a* and 4*b* show vibrating device 1 mounted on a platform 10 of a portable object, which is preferably a wristwatch. In order to avoid overloading the Figures, platform 10 is mainly shown, housed in a case of the wristwatch 100 that is partially shown. This platform can be the plate of a watch. A printed circuit, which is not shown, can be made on one part of platform 10 for the electrical connection of the various electrical components of the watch.

As can be seen in FIG. 3, the vibrating device is secured to platform 10 so that connection terminals 7 of the coil come into contact with metallic paths 17 of platform 10. These metallic paths 17 are connected in particular to a drive circuit for the vibrating device which is not shown.

When vibrating device 1 is secured to platform 10, projecting element 26 is positioned in a guide housing 21 made in a rigid wall 20 partly surrounding vibrating device 1. When the moving mass is in the rest position, projecting element 26 is positioned at the centre of guide housing 21.

Housing 21 has a section, as shown in FIG. 4*b*, of substantially rectangular shape with a width slightly larger than the thickness of projecting element 26 but less than twice the thickness of this projecting element. The length of housing 21 in the direction of oscillation along the X axis is dimensioned so as to allow the moving mass to oscillate freely in the direction of oscillation at least up to a determined maximum amplitude value. The edges of this housing act as stop members for projecting element 26 to limit the movement amplitude in all directions.

Owing to the combination of the determined depth of guide housing 21 of wall 20, and flat part 4*d* provided with the guide aperture of projecting element 16, the vibrating device is properly protected against mechanical shocks in all directions.

It is not necessary to surround the vibrating device with said wall. Consequently, instead of providing a guide housing in said wall, a plate having a longitudinal aperture or a U-shaped part can be mounted on the platform in order to receive the second projecting element of the vibrating device.

It should be noted that even if the protection means have been described hereinbefore for a vibrating device of the half Voice Coil type, these protection means can also be applied to any other vibrating device operating in accordance with an equivalent principle, such as that disclosed in EP Patent No. 0 625 738 for example.

From the description that has just been given, those skilled in the art can devise multiple variants of the vibrating device without departing from the scope of the invention defined by the claims. Several projecting elements can be provided on each side of the moving mass for cooperating with the aperture in the part or with the platform wall housing of the portable object. The fixed structure or the part of the spring element can also include a protruding part guided in a longitudinal groove made in one part of the moving mass facing the structure in order to protect the vibrating device against mechanical shocks. An additional fixed part of the vibrating device can be arranged on an opposite side to the fixed base strip of the spring element. This additional fixed part includes a guide housing for the second projecting element of the vibrating device to protect the vibrating device by the projecting elements placed on two opposite sides of the moving mass cooperating with the guide means.

What is claimed is:

1. A vibrating device for a portable object, such as a wristwatch, the device including a moving mass formed in part of a magnetic structure connected to a fixed structure via a spring element, and a coil connected to the fixed structure without any mechanical contact with the moving mass and electro-magnetically coupled to the moving mass to enable said mass to oscillate in at least one direction of oscillation when it is powered by alternating electrical signals at a determined frequency, wherein one fixed part of the vibrating device is arranged so as to cooperate with one part of the moving mass to enable the moving mass to oscillate freely in a normal operating mode of the vibrating device at least to a determined maximum amplitude value, and to limit the movement amplitude of the moving mass in a determined manner in all directions in order to protect the vibrating device from mechanical shocks, wherein the spring element includes a base strip secured to the fixed structure, and two strip springs integral with the base strip and arranged substantially perpendiculary to the base strip on two opposite sides of said base strip, the mass being held between the two strip springs, wherein the fixed part of the vibrating device includes a part integral with the base strip which is arranged on one side of the base strip parallel to the direction of oscillation of the moving mass, and wherein the moving mass includes a projecting element on the side of the base strip positioned in guide means defined by said part or by a combination of the part and the fixed structure to enable the moving mass to oscillate freely during normal operation in a determined direction of oscillation and to limit the movement amplitude of the moving mass in a determined manner in each direction with respect to a central position of the projecting element of the moving mass at rest.

2. The vibrating device according to claim 1, wherein a flat part is arranged perpendicularly with respect to the base strip, wherein the part includes a longitudinal aperture in the direction of oscillation in combination with a surface of the fixed structure to which the base strip is secured to define the guide means, the projecting element of the moving mass being arranged in part through the longitudinal aperture, and wherein the width of the aperture is of larger dimensions than the thickness of the part of the projecting element passing through the aperture, and less than twice the thickness of the part of said projecting element.

3. The vibrating device according to claim 1, the device including a flat annular coil, which is formed of one winding with one or several substantially coaxial turns and secured to the fixed non-magnetic structure, and a moving mass, which includes at least one permanent magnet positioned facing a portion of coil, a ferromagnetic plate to which the permanent magnet is fixed and a complementary plate secured to the ferromagnetic plate, the moving mass being intended to oscillate in a plane perpendicular to an axis of the coil, wherein the spring element includes an end strip connecting the ends of the strip springs opposite the base strip, the end strip being parallel to the base strip and wherein the ferromagnetic plate of the moving mass is secured to the end strip.

4. The vibrating device according to according to claim 3, wherein the ferromagnetic plate includes the projecting element positioned in the guide means of the vibrating device.

5. The vibrating device according to claim 1, wherein the moving mass includes a second projecting element arranged on one side of the moving mass opposite the first projecting element, and wherein the second projecting element is to be positioned in a guide housing of suitable dimensions, which is made in one wall of an inner platform of a portable object when the vibrating device is secured to the platform.

6. The vibrating device according to claim 5, wherein the first and second projecting elements of the moving mass are arranged on a line substantially perpendicular to the direction of oscillation of the moving mass.

7. The vibrating device according to claim 1, wherein the fixed structure includes, as the fixed part, a housing in one wall facing the moving mass, and wherein the moving mass includes a projecting element positioned in the housing of the fixed structure so as to limit the determined movement amplitude of the moving mass in each direction.

8. A portable object including a vibrating device according to claim 1, the vibrating device being secured to a platform of the portable object, wherein the platform includes a wall with a guide housing in which a projecting element of the moving mass of the vibrating device is positioned, said projecting element being arranged on one side of the moving mass opposite the fixed structure, the guide housing being of suitable dimensions so as to enable the moving mass to oscillate freely in normal operating mode of the vibrating device at least up to a determined maximum amplitude value, and to limit the movement amplitude of the moving mass in a determined manner in all directions in order to protect the vibrating device from mechanical shocks.

* * * * *